(12) United States Patent
Shannon et al.

(10) Patent No.: US 7,474,402 B2
(45) Date of Patent: Jan. 6, 2009

(54) REFLECTANCE SENSOR FOR INTEGRAL ILLUMINANT-WEIGHTED CIE COLOR MATCHING FILTERS

(75) Inventors: Colman Shannon, Lawrenceville, NJ (US); David Slocum, Yardley, PA (US); Michael Vhrel, Sammamish, WA (US)

(73) Assignee: Datacolor Holding AG, Luzern (CH)

( * ) Notice: Subject to any disclaimer, the term of this patent is extended or adjusted under 35 U.S.C. 154(b) by 23 days.

(21) Appl. No.: 11/387,376

(22) Filed: Mar. 23, 2006

(65) Prior Publication Data

US 2006/0215162 A1    Sep. 28, 2006

Related U.S. Application Data

(63) Continuation-in-part of application No. 11/281,152, filed on Nov. 16, 2005.

(60) Provisional application No. 60/664,118, filed on Mar. 23, 2005.

(51) Int. Cl.
*G01N 21/27* (2006.01)
*G01J 3/51* (2006.01)

(52) U.S. Cl. .......... 356/405; 356/406; 356/419

(58) Field of Classification Search .......... 356/402, 356/419, 405, 406
See application file for complete search history.

(56) References Cited

U.S. PATENT DOCUMENTS

| | | | |
|---|---|---|---|
| 4,150,898 A | 4/1979 | Suga | |
| 4,547,074 A * | 10/1985 | Hinoda et al. | 356/405 |
| 4,764,670 A * | 8/1988 | Pace et al. | 250/226 |
| 4,830,501 A * | 5/1989 | Terashita | 356/402 |
| 4,876,167 A | 10/1989 | Snow et al. | |
| 4,923,860 A | 5/1990 | Simons | |
| 4,965,242 A | 10/1990 | De Boer | |
| 5,144,498 A | 9/1992 | Vincent | |
| 5,166,126 A | 11/1992 | Harrison et al. | |
| 5,168,320 A | 12/1992 | Lutz et al. | |
| 5,272,518 A | 12/1993 | Vincent | |
| 5,419,990 A | 5/1995 | Wake et al. | |
| 5,521,035 A | 5/1996 | Wolk et al. | |
| 5,599,766 A | 2/1997 | Boroson et al. | |
| 5,631,703 A | 5/1997 | Hamilton et al. | |
| 5,671,059 A | 9/1997 | Vincent | |
| 5,691,817 A | 11/1997 | Cargill et al. | |
| 5,719,074 A | 2/1998 | Hawkins et al. | |
| 5,726,805 A | 3/1998 | Kaushik et al. | |
| 5,729,360 A | 3/1998 | Kita et al. | |

(Continued)

OTHER PUBLICATIONS

International Search Report and Written Opinion for PCT/US2006/010724; mailing date Sep. 15, 2006; date of receipt Sep. 18, 2006; consists of 12 unnumbered pages.

(Continued)

*Primary Examiner*—Kara E. Geisel
*Assistant Examiner*—Bryan Giglio (57) ABSTRACT

A tristimulus colorimeter for measuring reflective or transmissive materials is provided. The colorimeter measures a sample under a calibrated light source, receives inputs to detectors, and determines CIE tristimulus values of the same sample as they would occur under a reference light source. The colorimeter includes a calibrated light source and a single silicon chip that includes three or more detectors. Each detector is permanently coated by a different mix of dyes or other colorants that form a wavelength-selective filter. A single silicon chip embodies all the detectors and electronics, with each detector coated over by deposited filter layers.

20 Claims, 11 Drawing Sheets

U.S. PATENT DOCUMENTS

| | | | |
|---|---|---|---|
| 5,871,871 A | 2/1999 | Hogan et al. | |
| 5,892,585 A | 4/1999 | Lianza et al. | |
| 5,926,282 A * | 7/1999 | Knobloch et al. | 356/419 |
| 5,929,432 A | 7/1999 | Yamakawa | |
| 5,963,333 A | 10/1999 | Walowit et al. | |
| 6,020,583 A | 2/2000 | Walowit et al. | |
| 6,083,649 A | 7/2000 | Takeshita et al. | |
| 6,111,300 A | 8/2000 | Cao et al. | |
| 6,147,761 A | 11/2000 | Walowit et al. | |
| 6,163,377 A | 12/2000 | Boles et al. | |
| 6,252,663 B1 * | 6/2001 | Cooper | 356/416 |
| 6,330,029 B1 | 12/2001 | Hamilton et al. | |
| 6,362,513 B2 * | 3/2002 | Wester | 257/432 |
| 6,365,304 B2 | 4/2002 | Simons | |
| 6,566,723 B1 | 5/2003 | Vook et al. | |
| 6,604,466 B2 | 8/2003 | Komori et al. | |
| 6,628,331 B1 | 9/2003 | Bean | |
| 6,760,475 B1 * | 7/2004 | Miller | 382/162 |
| 6,771,314 B1 * | 8/2004 | Bawolek et al. | 348/272 |
| 6,774,988 B2 | 8/2004 | Stam et al. | |
| 6,804,006 B2 | 10/2004 | Griffus et al. | |
| 6,816,262 B1 | 11/2004 | Slocum et al. | |
| 6,933,168 B2 * | 8/2005 | Bawolek et al. | 438/70 |
| 6,947,143 B2 | 9/2005 | Kritchman et al. | |
| 7,095,009 B2 | 8/2006 | Harada et al. | |
| 7,132,644 B2 * | 11/2006 | Grunert et al. | 250/226 |
| 7,285,768 B2 * | 10/2007 | Tan et al. | 250/226 |
| 2002/0003201 A1 * | 1/2002 | Yu | 250/208.1 |
| 2003/0128310 A1 | 7/2003 | Takizawa et al. | |
| 2003/0218123 A1 | 11/2003 | Harada et al. | |
| 2004/0100570 A1 * | 5/2004 | Shizukuishi | 348/272 |
| 2004/0105265 A1 | 6/2004 | Takizawa | |
| 2005/0078187 A1 * | 4/2005 | Fabricius et al. | 348/187 |
| 2005/0205765 A1 | 9/2005 | Tan et al. | |
| 2005/0206759 A1 * | 9/2005 | Fukunaga et al. | 348/294 |
| 2005/0207044 A1 * | 9/2005 | Oon et al. | 359/885 |
| 2006/0103864 A1 * | 5/2006 | Shannon et al. | 358/1.9 |
| 2006/0215193 A1 * | 9/2006 | Shannon et al. | 358/1.9 |

OTHER PUBLICATIONS

Mark Wolski, et al., "Optimization of Sensor Response Functions for Colorimetry of Reflective and Emissive Objects," IEEE Transactions on Image Processing, IEEE Service Center, Piscataway, NJ, US, vol. 5, No. 3, Mar. 1996 XP011025973 ISSN: 1057-7149.

Engelhardt, K., et al., "Optimum Color Filters for CCD Digital Cameras" Applied Optics, OSA, Optical Society of America, Washington, DC, US, vol. 32, No. 16, Jun. 1, 1993, pp. 3015-3023, XP000345897 ISSN: 0003-6935.

Sharma, G. and Trussell, J.H., "Digital Color Imaging", Jul. 1997, IEEE Transactions on Image Processing, vol. 6, No. 7.

PCT International Search Report for PCT/US05/41628; consists of 9 unnumbered pages.

PCT Search Report for PCT/US06/10899; Consists of 8 unnumbered pages.

Richard F. Lyon and Paul M. Hubel, "Eyeing the Camera: into the Next Century," Imaging Science & Technology, Society for Info. Display, Color Imagery Conference, Nov. 2002, Scottsdale, AZ.

MAZeT presents True Colour Sensors for Colorimetric, Press Release, MAZeT GmbH, http://www.omimo.be/vpr/layout/display/pr.asp?PRID=7628, Aug. 26, 2004.

"True Color ICs Allow Colour Measurement To DIN 5033," MAZeT Gmb H, http://www.mazet.de/produkte/farbsensoren/mtcs/en, 2005.

"Modular Jencolour OEM Hardware Solution" MAZeT Gmb H, http://www.mazet.de/produkte/farbsensoren/mtcs/en, 2005.

"Data Sheet MTCSiCS, Integral True Colour Sensor—LCC8" MAZeT Gmb H, http://www.mazet.de/produkte/farbsensoren/mtcs/en, Apr. 18, 2005.

"Data Sheet MTCSiCT, Integral True Colour Sensor—TO39" MAZeT Gmb H, http://www.mazet.de/produkte/farbsensoren/mtcs/en, Apr. 18, 2005.

"Data Sheet MTCSiCO, Integral True Colour Sensor—TO39 with optics" MAZeT Gmb H, http://www.mazet.de/produkte/farbsensoren/mtcs/en, Apr. 18, 2005.

R. W. G. Hunt, Measuring Colour, second ed., pp. 178-181, Ellis Horwood Limited, 1991.

Vos, J.J., Colorimetric and photometric properties of a 2 degree fundamental observer, Color Res. & Appl. 3, 125-128 (1978).

Oriel Insturment Catalog, Figure 5, p. 6-23, 2000.

PCT Search Report for PCT/US2006/010724; Aug. 11, 2008, Copy Consists of 10 unnumbered pages.

* cited by examiner

FIG. 7

REFLECTANCE SENSOR FOR INTEGRAL ILLUMINANT-WEIGHTED CIE COLOR MATCHING FILTERS

CROSS-REFERENCES

The present application claims the benefit of U.S. Provisional Application No. 60/664,118, filed Mar. 23, 2005, which is herein incorporated by reference. The present application is a continuation-in-part of commonly owned, pending U.S. application Ser. No. 11/281,152, entitled "TRISTIMULUS COLORIMETER HAVING INTEGRAL DYE FILTERS", filed Nov. 16, 2005, which is herein incorporated by reference. The present application is related to commonly owned U.S. Pat. No. 6,163,377, issued Dec. 19, 2000, which is herein incorporated by reference. In addition, the present application is related to commonly owned U.S. application Ser. No. 11/281,766, entitled "METHOD FOR DESIGNING A COLORIMETER HAVING INTEGRAL CIE COLOR-MATCHING FILTERS", filed Nov. 16, 2005, which is herein incorporated by reference.

BACKGROUND

1. Field of the Invention

The present invention generally relates to optics and colorimetry and, in particular, relates to a reflectance sensor having particular optical dye thicknesses for deposited filters that are designed through the use of varying densities of a controlled set of dyes, such that, when weighted by a colorimeter illuminant-spectrum, the deposited filters approximate Commission Internationale de l'Eclairage (CIE) color-matching functions, weighted by a reference illuminant spectrum.

2. Description of the Related Art

Colorimeters that measure reflective or transmissive colors with the same spectral sensitivities as the human visual system use composite parts that have negative impacts on cost, assembly, mechanical robustness, and optical efficiency. For example, conventional reflective- and transmissive-mode colorimeters deploy multiple light emitting diode (LED) light sources and a single detector. By use of such multiple light sources conventional colorimeters determine the tristimulus values of a reflective sample as they would appear under a selected light source (e.g., CIE standard illuminant D50 or D65). However, the multiplicity of light sources has economic and engineering disadvantages.

SUMMARY OF THE INVENTION

The present invention includes various embodiments of a colorimeter having integral dye filters for measuring reflective or transmissive materials. For example, the colorimeter measures a sample under a calibrated light source, receives inputs to a plurality of filtered detectors, and determines CIE tristimulus values of the same sample as they would occur under a different light source. One embodiment of the device includes a calibrated light source and a silicon chip that contains three or more detectors, each coated by a different mix of dyes to form a wavelength-selective filter. The silicon chip embodies all the detectors and electronics, with each detector coated over by a deposited filter layer.

Another embodiment is a solid-state color-measuring device that includes at least one light source comprising a colorimeter illuminant, a number of light detectors, and a number of filters. The colorimeter illuminant illuminates a sample. The filters are permanently deposited onto the solid-state color-measuring device. The filters are included in a number of layers such that light reflected off the sample passes through the layers and causes the light detectors to produce output. The output has spectral responses, each approximating a CIE-like color-matching function weighted by a reference illuminant.

Yet another embodiment is a colorimeter that includes at least one light source, a semiconductor substrate having three or more photodetectors, three or more filters permanently deposited on the photodetectors, and a number of channels, which include the photodetectors and filters. Each filter is included in a set of layers having at least a single layer and one at least one double layer. Particular linear combinations of spectral responses of the channels are weighted by the colorimeter illuminant, each approximating a reference-illuminant-weighted CIE-like target color-matching function.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention includes various embodiments of a colorimeter having integral illuminant-weighted CIE color matching filters embedded onto a semiconductor chip. Filters include colorants: pigments, dyes, and the like. Some applications of the embodiments described include a printer calibration system for reflective color measurement in which at least one light source illuminates a sample, such as a piece of paper. However, embodiments of the present invention have many applications in colorimetry in addition to these printer applications. Colorimetry is the science and practice of determining and specifying colors and quantitative analysis by color comparison. In colorimetry, colors can be described in numbers and physical color can be matched using a variety of measurement instruments, such as colorimeters, spectrophotometers, densitometers, and spectroradiometers. Colorimetry is used in many industries, including photography, softproofing, digital color communication, interior design, architecture, consumer electronics, chemistry, color printing, textile manufacturing, and paint manufacturing, digital imaging, graphic design, plastics, leather, automotive, coatings, apparel, ink, printing, paper and others. A person of ordinary skill in the art will recognize that the present invention is applicable to colorimetry in many industries and to many kinds of measurement instruments.

One embodiment is a tristimulus colorimeter for measuring reflective or transmissive materials. This embodiment deposits inks or dyes onto the sensor so as to mimic specific spectral sensitivities either of the human visual system as represented by CIE color-matching functions (for the emissive-mode colorimeter) or of, when weighted by a colorimeter illuminant spectrum, the CIE color matching functions multiplied by a reference illuminant spectrum.

One embodiment of a reflective-mode colorimeter differs from emissive-mode colorimeters as follows. Many emissive-mode colorimeters measure light emitted directly from a light source, such as a computer display screen. Some emissive-mode colorimeters best-fit a set of filter transmittances weighted by detector sensitivities to the CIE color-matching functions. Many reflective-mode colorimeters measure light reflected from a sample, where the light is generated from a calibrated light source. By contrast, this embodiment of a reflective-mode colorimeter best-fits a set of filter transmittances weighted by detector sensitivities times the calibrated light source spectrum to the CIE color-matching functions weighted by a reference illuminant spectrum (typically, CIE standard source D50 or D65). Unlike conventional reflective-mode and transmissive-mode colorimeters that have multiple light sources or multiple color sensors, one embodiment of a reflective-mode colorimeter includes only a single light source and a single-chip color sensor.

One embodiment of a transmissive-mode colorimeter is similar in concept to the reflective-mode colorimeter, as it includes an intrinsic calibrated light source, but there is a difference in the location of the sensor and how light is measured. The reflective-mode colorimeter locates the sensor on the same side of the sample as the light source and, hence, measures light reflected from the sample. However, the transmissive-mode colorimeter locates the sensor on the opposite side of the sample as the light source and, hence, measures the light transmitted through the sample.

One embodiment is a colorimeter that is a solid-state device having light detectors and filters. Filters are permanently deposited onto the solid-state device using methods familiar to those of ordinary skill in the art of manufacturing solid-state light detectors. The device has an output of spectral responses that are linearly combined to approximate CIE or CIE-like color-matching functions weighted by the ratio of the reference illuminant spectrum to the colorimeter light source spectrum. Some examples of CIE-like color matching functions include the CIE 1931 2-degree color-matching functions, CIE 1964 10-degree color-matching functions, or modifications of the CIE functions, such as derived by D. Judd (1951) or by J. J Vos (1978). In one embodiment, the filters include a number of colorants of various thicknesses and in various combinations. In one embodiment, colorants are in the form of dyes or pigments. The filters are permanently deposited onto either a single detector or a plurality of detectors on the device.

One embodiment is a method of designing a sensor for use in a reflectance colorimeter. A solution of combinations of colorants is derived, where the solution maximizes the number of combinations of colorants used singly and minimizes the combinations of colorants. In one embodiment, this method is computational and may operate on a processor. In one embodiment, the method results in a selection of the optimum combination of colorants according to predetermined criteria. The combination of colorants is used on the light detectors, which have known responses to light photons. The colorants are computationally selected from a larger set of colorants. The computation takes into account the combined response of the light source, the colorants, and the detectors to select the optimum solution so that the output of the device has spectral responses that approximate illuminant-weighted CIE or CIE-like color-matching functions and so that the performance of the device meets predetermined criteria.

Figure 1A:
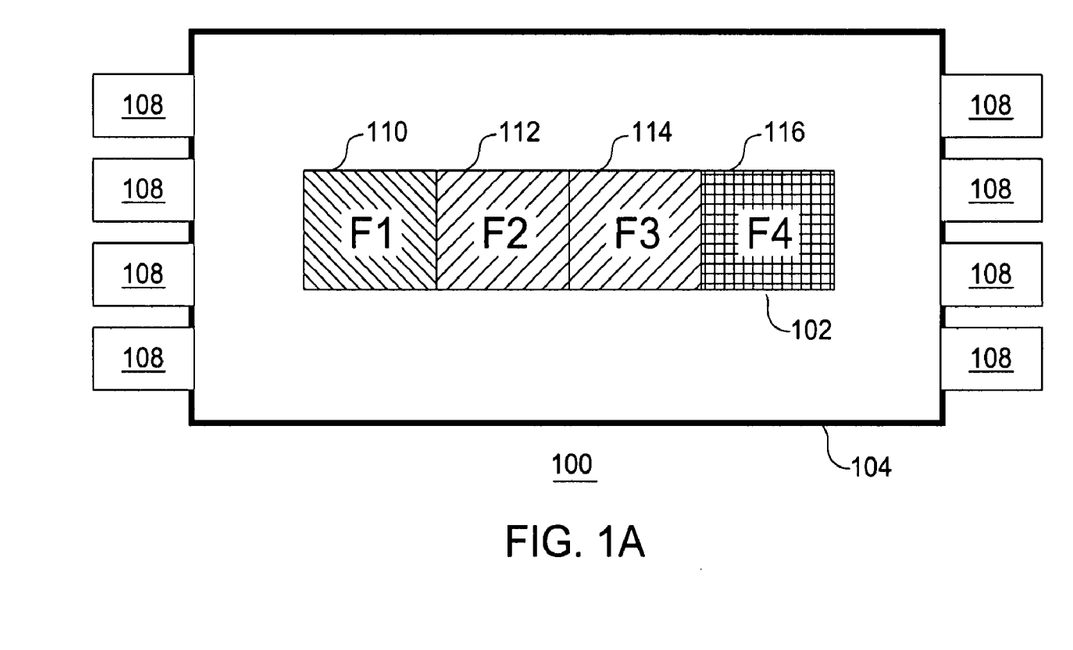
FIGS. 1A and 1B are top and side views, respectively, of an exemplary embodiment of a configuration of dye filter layers on a semiconductor chip having photodetectors.
Figure 1B:
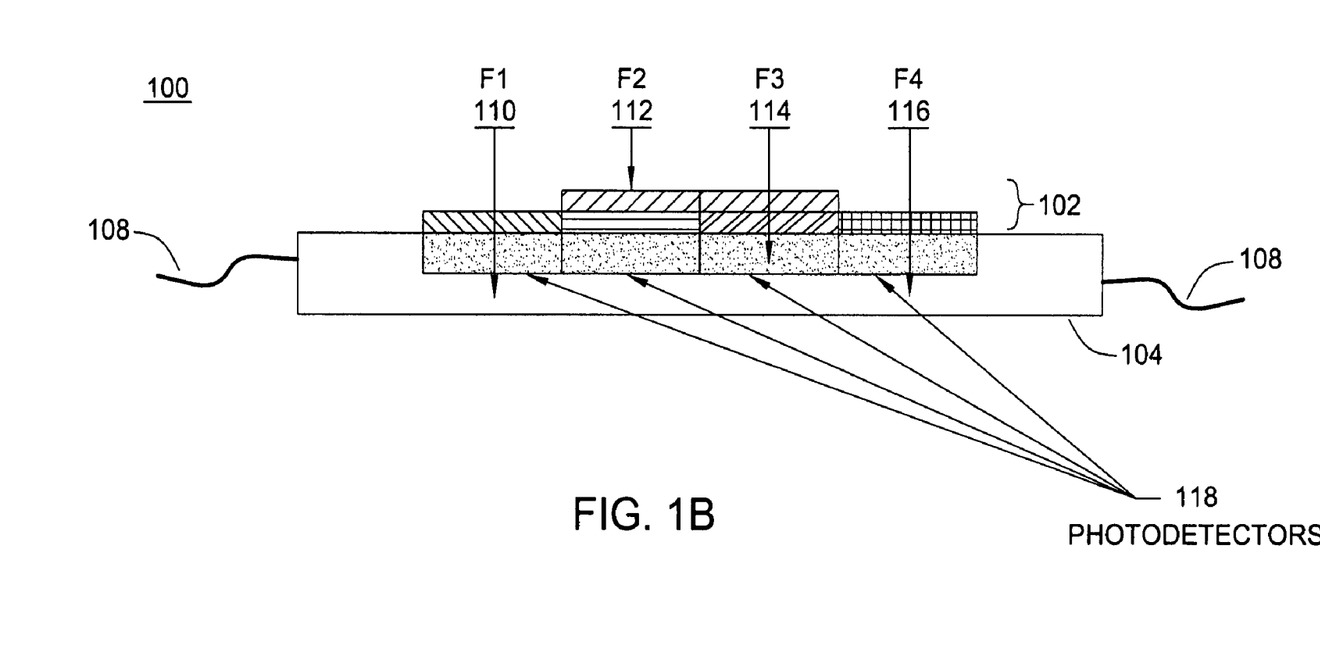

FIGS. 1A and 1B are top and side views, respectively, of an exemplary embodiment of a configuration 100 of dye filter configuration 102 on a semiconductor chip, (e.g., a light-to-frequency semiconductor device) having photodetectors 118 (FIG. 1B). Photodetectors are also known as photodiodes, photosensor elements, and photodetecting elements. There are many possible configurations 100 of three or more dye filter configuration 102 and FIG. 1B illustrates one possible configuration 100, in which there are 2 single-layer filters 110,116 and 2 double-layer filters (2D2S) 112,114. In one embodiment, the filters are arranged in the simplest linear 4-detector array. The semiconductor chip 104 has a standard 8-pin 108 integrated circuit package. Other embodiments have a different number of pins. In FIGS. 1A and 1B, each photodetector 118 is covered by one of four types of integral absorptive colorant configurations 102, (i.e., F1 110, F2 112, F3 114, and F4 116), each of which may be a single or multiple layer structure. Colorants include pigments, dyes, and the like. In one embodiment, F1 110 is a single green layer, F2 112 is a double layer of cyan and blue (as seen from the side in FIG. 1B), F3 114 is a double layer of cyan and magenta (as seen from the side in FIG. 1B) and F4 116 is a single yellow layer. Other embodiments include more or fewer types of filters. On each of the photodetectors is deposited single or multiple filter layers.

FIG. 1B is a side view of FIG. 1A, showing a cross section of the dye filter configurations 102. In this exemplary embodiment, the semiconductor chip 104 includes a semiconductor substrate 204 constructed (e.g., by depositing) with four photodetectors 118 and four dye filter configurations 102. Each dye filter configuration 102 is integral with one of the photodetectors 118. In FIG. 1B, F1 110 and F4 116 are single-layer structures, while F2 112 and F3 114 are double-layer structures. F1 110 is a single green layer, F2 112 is a double layer of cyan and blue, F3 114 is a double layer of cyan and magenta, and F4 116 is a single yellow layer. In other embodiments, there are at least three photodetectors 118 with corresponding dye filter configurations 102. In other embodiments, the dye filter configurations 102 may have various layer structures with any number of layers and each filter may be a single or multiple layer structure (i.e., two or more layers).

Figure 2A:
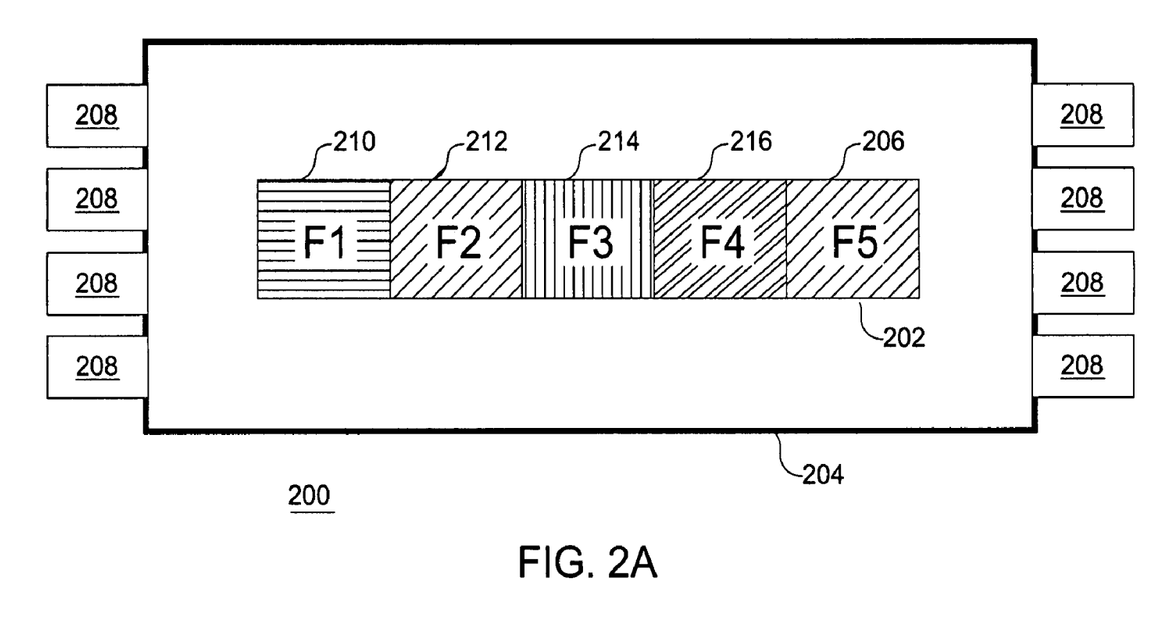
FIGS. 2A and 2B are top and side views, respectively, of an exemplary embodiment of another configuration of dye filter layers on a semiconductor chip having photodetectors.

FIG. 2A is a top view of an exemplary embodiment of another configuration 200 of dye filter structures 202 on a semiconductor chip 204 constructed with five photodetectors 204 and five dye filter structures 202. Each dye filter structure 202 is integral with one of the photodetectors 204.

Figure 2B:
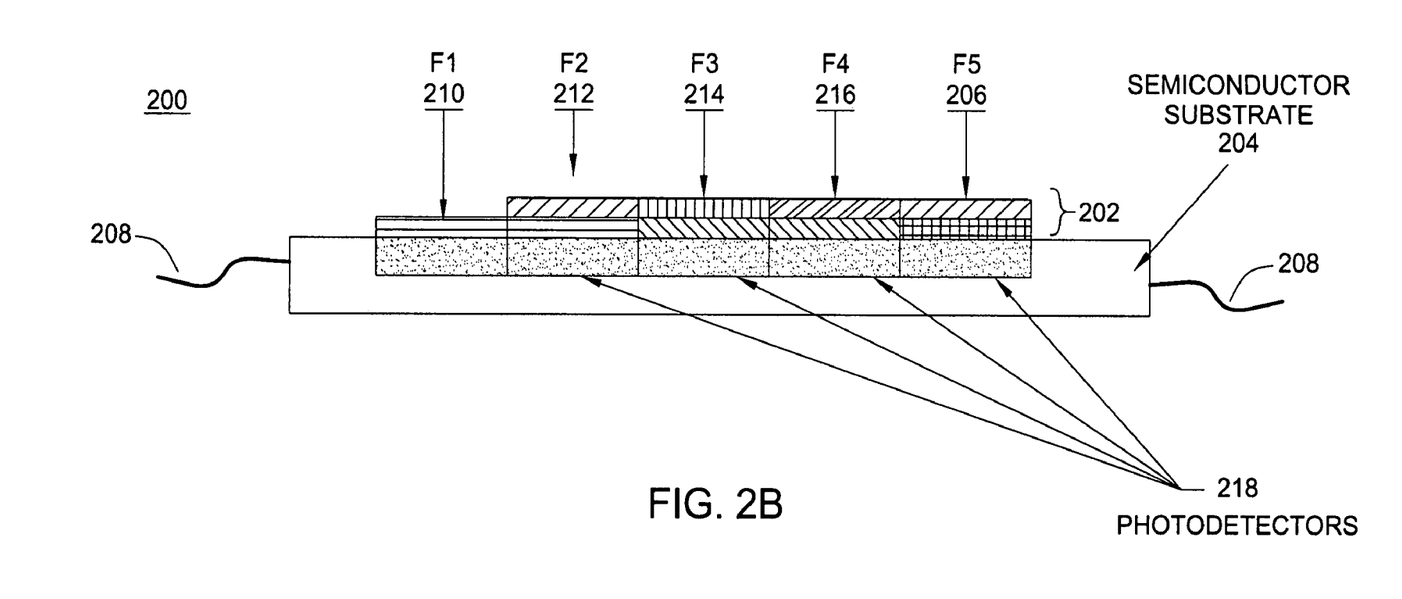

FIG. 2B is a side view of FIG. 2A. In this exemplary embodiment, the semiconductor chip 204 includes a semiconductor substrate 204 constructed with five photodetectors 204 and five dye filter structures 202. Each dye filter configuration 102 covers one of the photodetectors 218. FIGS. 2A and 2B are similar to FIGS. 1A and 1B, except a 5-filter configuration is shown, with four of the filters being double-layered and one being single-layered (4D1S). In FIG. 2B, F1 210 is a single-layer structure, while F2 212, F3 214, F4 216, and F5 206 are double-layer structures. Other embodiments may have three or more photodetector channels on which are deposited dye filter structures 202, each structure being at least a single layer with at least one being a double layer.

Figure 3:
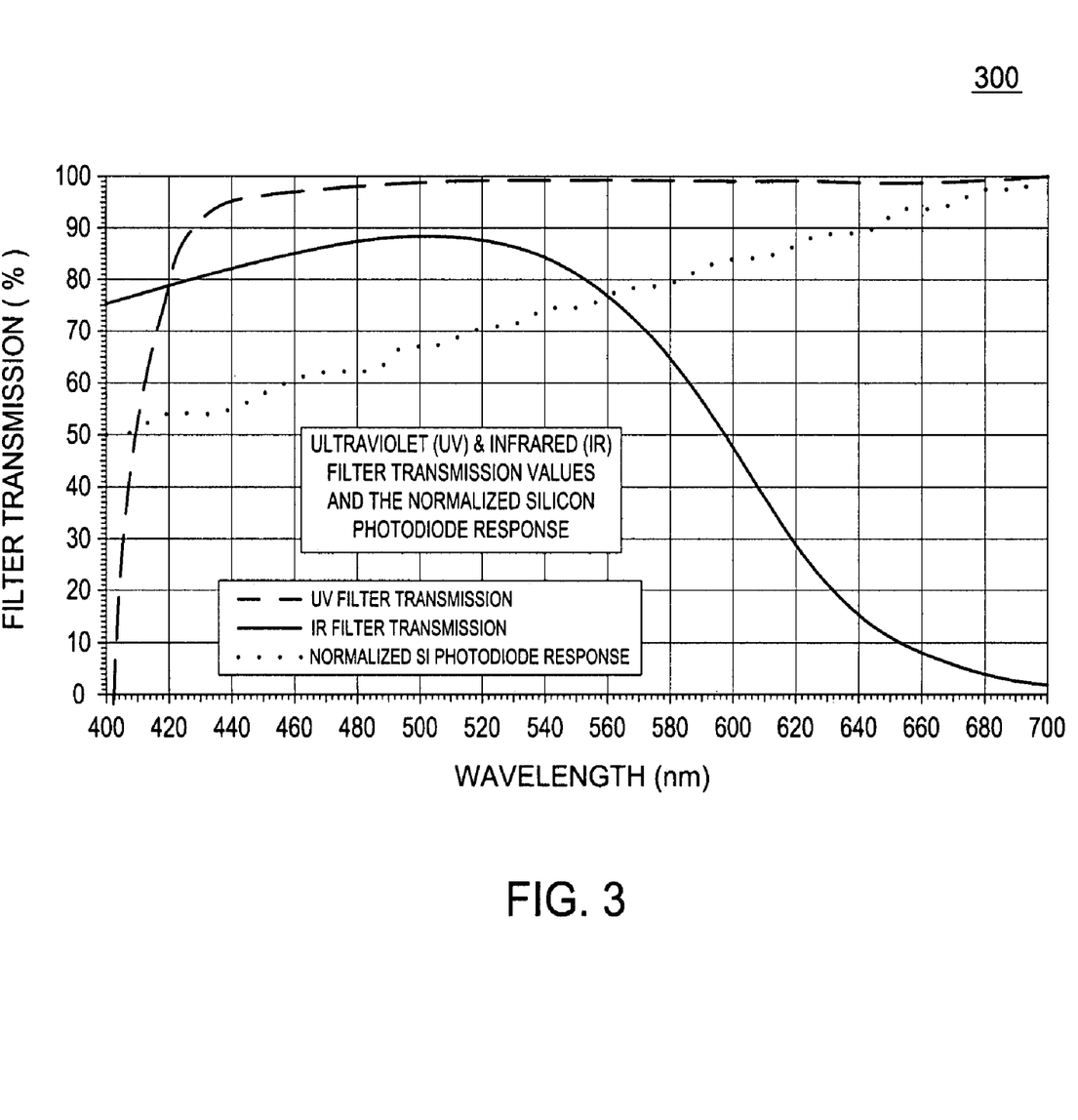
FIG. 3 is a graph of exemplary ultraviolet (UV) and infrared (IR) filter transmission values and the normalized silicon photodetector response for the exemplary embodiment of FIGS. 2A and 2B.

FIG. 3 is a graph showing transmissions of the ultraviolet (UV) and infrared (IR) filters, which narrow the spectral range of the light that reaches the semiconductor chip 104. FIG. 3 also shows the typical spectral response of a silicon photodiode.

The following is a list of an exemplary set of equations to calculate tristimulus values using the exemplary embodiment of FIGS. 1A and 1B. The set of equations uses the best fit least squares coefficients for calculating the X, Y, & Z tristimulus values.

$$X = (F1\text{detector}*C_{x1}) + (F2\text{detector}*C_{x2}) + (F3\text{detector}*C_{x3}) + (F4\text{detector}*C_{x4});$$

$$Y = (F1\text{detector}*C_{y1}) + (F2\text{detector}*C_{y2}) + (F3\text{detector}*C_{y3}) + (F4\text{detector}*C_{y4});$$

$$Z = (F1\text{detector}*C_{z1}) + (F2\text{detector}*C_{z1}) + (F3\text{detector}*C_{z3}) + (F4\text{detector}*C_{z4});$$

The following table lists exemplary coefficients computed using the above equations for the best fit. The table also shows example values of the best fit coefficients $C_{jk}$.

| X Coef | Value | Y Coef | Value | Z Coef | Value |
|---|---|---|---|---|---|
| Cx1 = | −0.3586 | Cy1 = | 0.0668 | Cz1 = | −0.5788 |
| Cx2 = | 0.3354 | Cy2 = | 0.1662 | Cz2 = | 0.1934 |
| Cx3 = | 0.4658 | Cy3 = | 0.1887 | Cz3 = | −0.0090 |
| Cx4 = | 0.0778 | Cy4 = | −0.0721 | Cz4 = | 0.4172 |

Various exemplary embodiments may be generated using a method for designing a colorimeter having integral CIE color-matching filters. This method can be used to calculate filter layer structure and thicknesses of layers. In one embodiment, a set of channels is determined from a plurality of channels so that a linear combination of the set of colorimeter-illuminant-weighted channels matches a set of reference-illuminant-weighted CIE-like target color-matching functions within a tolerance. Each channel integrates at least one detector and at least one filter onto a single semiconductor substrate. A set of filters is determined for each channel. Each filter is an absorptive filter and the filters on each channel comprise at least one layer. There is at least one channel in which the filters comprise a double layer. A thickness is determined for each layer. A colorant is determined for each layer from a set of colorants. With a sufficiently high signal-to-noise ratio (SNR), good accuracy was obtained for a colorimeter with at least four filters with each channel containing at least a single filter layer and one channel containing a double filter layer. This provided the best approximation to the reference-illuminant-weighted CIE-like target color-matching functions with the least cost. Other exemplary embodiments of colorimeters having good performance and accuracy included a single double coated filter layer and three single coated filter layers, two double coated layers and two single coated filter layers and three double coated filter layers and one single coated filter layer. Some exemplary embodiments had filter layer thicknesses between about 0.50 and 2.00 microns. One of ordinary skill in the art will recognize that various other combinations of layer structures and thicknesses are also within the scope of the present invention.

Figure 4:
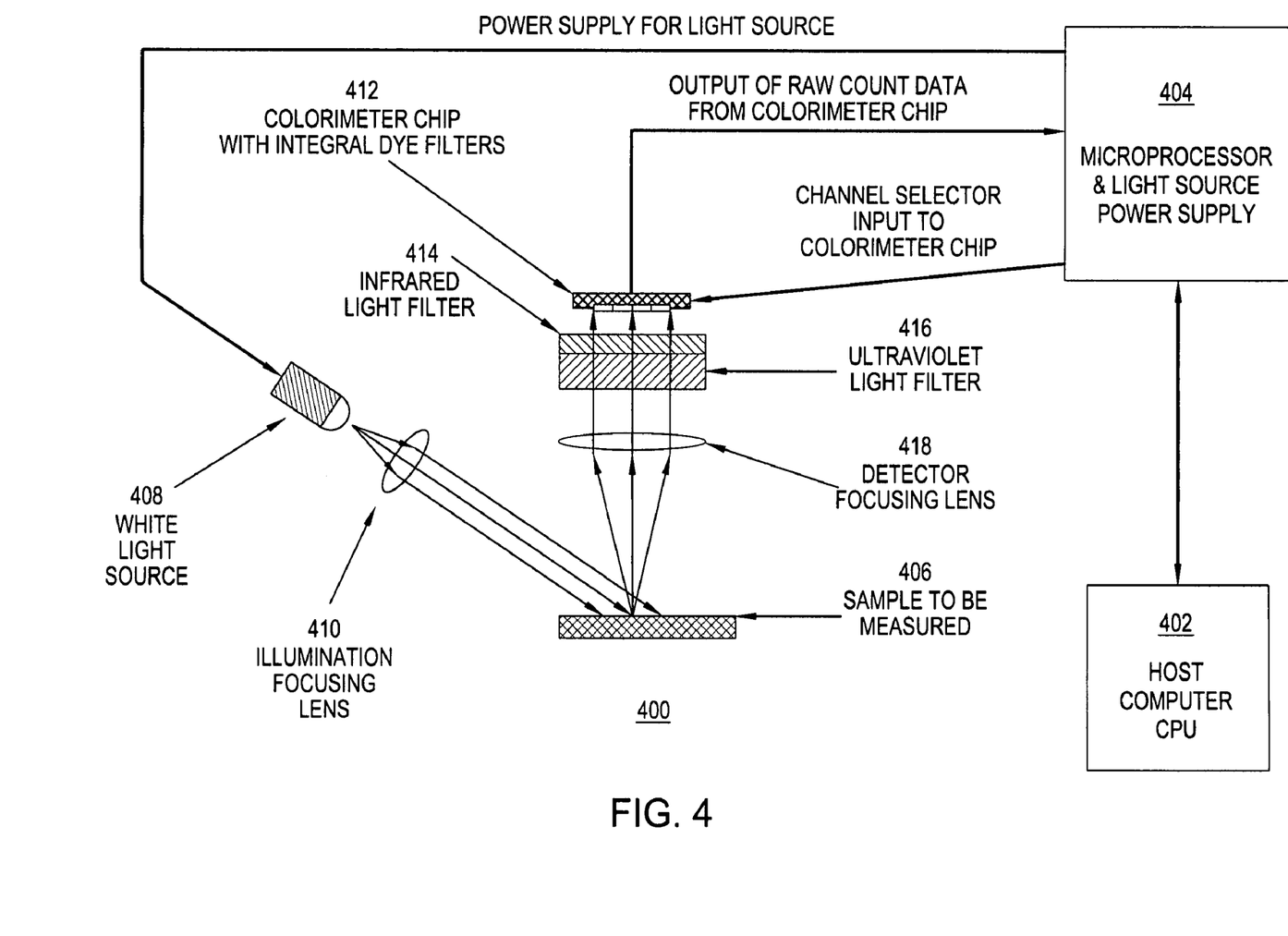
FIG. 4 shows an exemplary embodiment of a printer calibration system for a reflective 45/0 measurement application with a single light source.

FIG. 4 shows an exemplary embodiment of a printer calibration system 400 for a reflective 45/0 measurement application with a single light source. In this exemplary embodiment, a reflective colorimeter application uses a single light source 408 to illuminate a sample 406. This embodiment is not embedded in the printer.

Figure 5A:
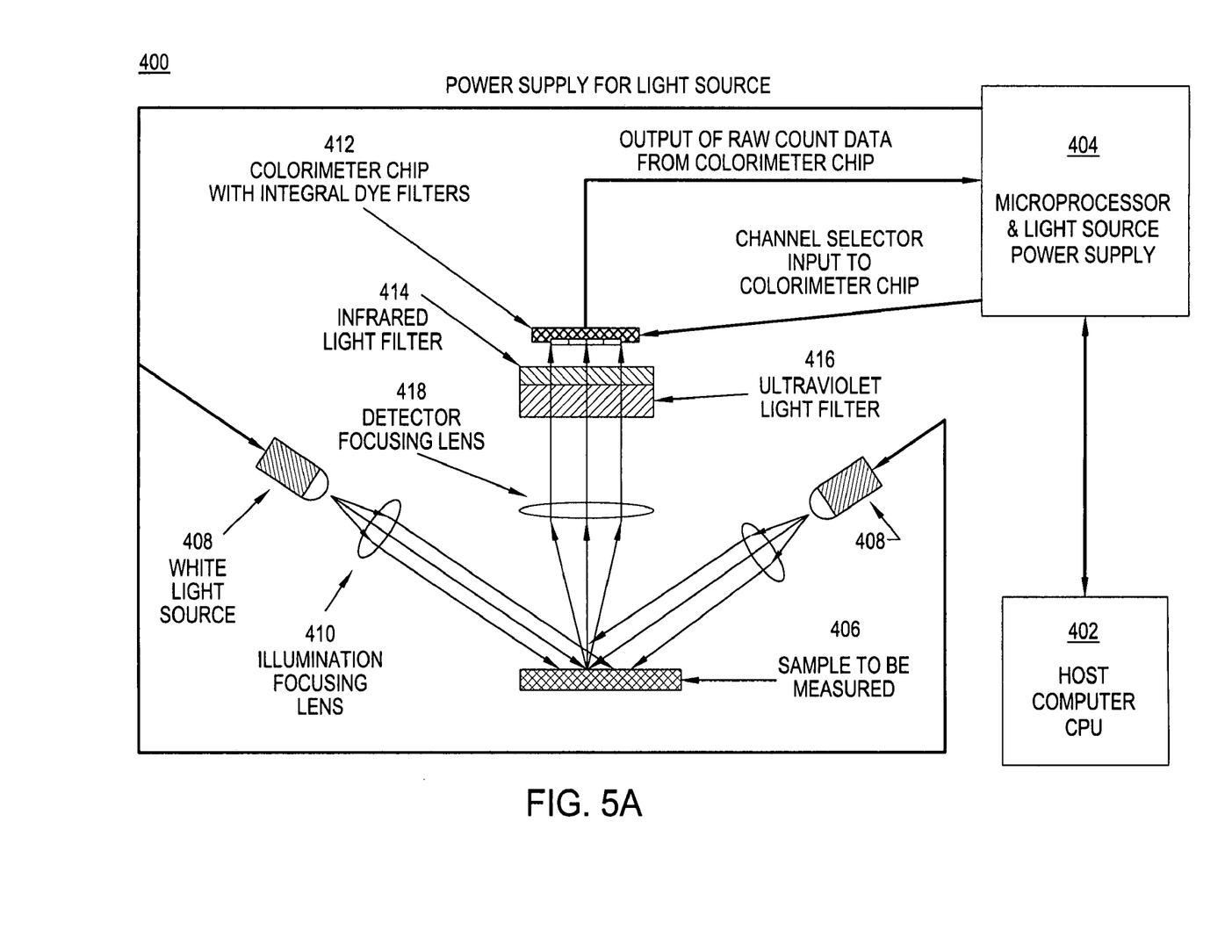
FIGS. 5A and 5B are side and top views, respectively, that illustrate the 45/0 measurement geometry with multiple light sources.
Figure 5B:
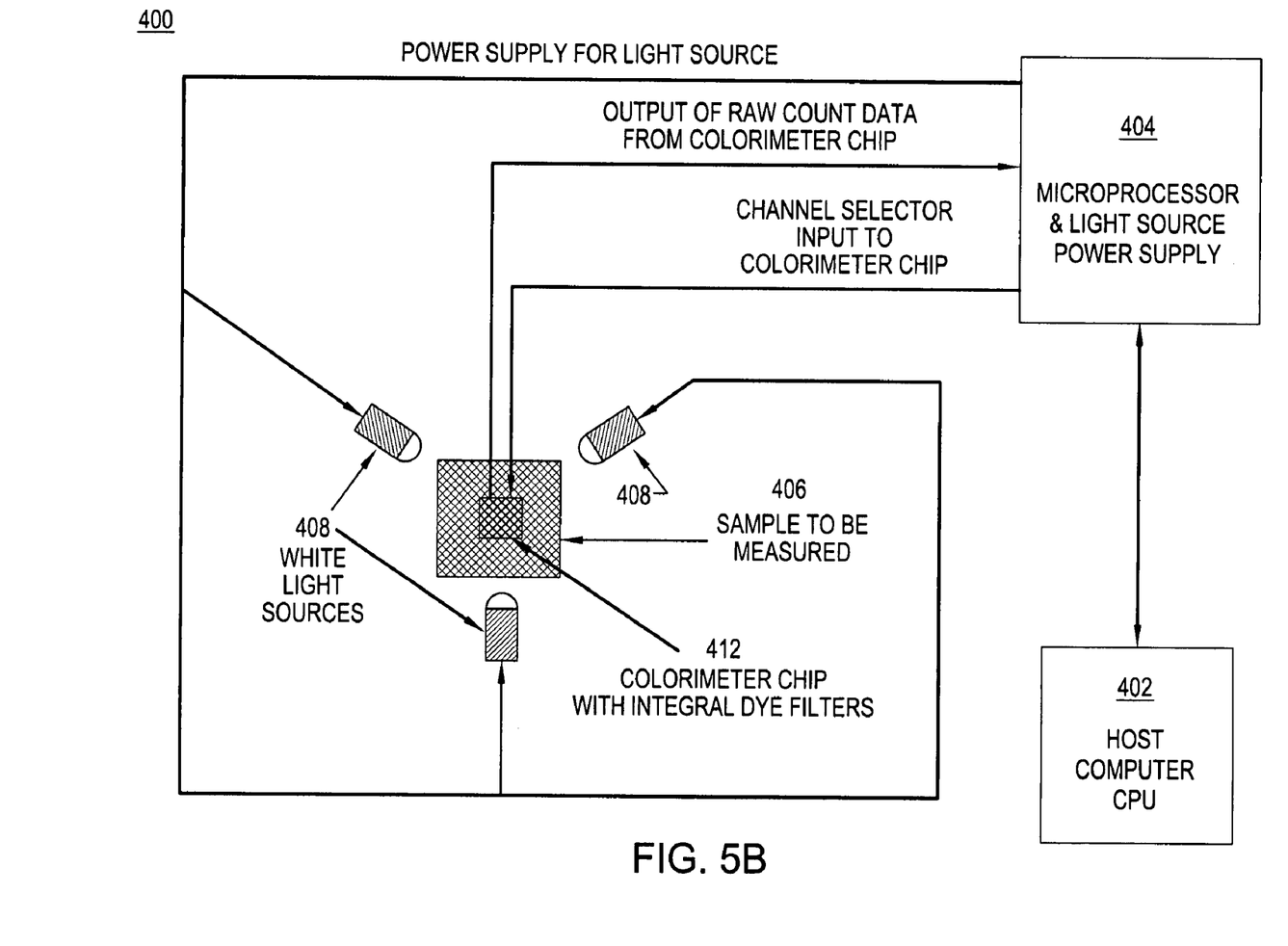

FIGS. 5A and 5B are side and top views, respectively, that illustrate the 45/0 measurement geometry with multiple light sources in the non-embedded embodiments. In FIGS. 5A and 5B, the sample 406 is illuminated at an angle of about 45° and the reflected light is viewed at an angle of about 0° (perpendicular to the sample 406). One of skill in the art will recognize that a range of other angles will also work.

The printer calibration system 400 includes a host computer that has a computer processing unit (CPU) 402 and is running a color measurement application. The host computer CPU 402 has two-way communication (e.g., cable, wireless) with a microprocessor and light source power supply 404 for sending command input and raw data output.

The microprocessor and light source power supply 404 powers and controls a colorimeter chip 412 and the white light source 408. In this embodiment, the microprocessor and light source power supply 404 is located inside a housing (not shown) surrounding the printer calibration system 400. The microprocessor and light source power supply 404 send one or more channel selector inputs to the colorimeter chip 412 and receives an output of raw count data from the colorimeter chip 412.

The white light source 408 may be a standard white light-emitting diode (LED), a tungsten light source with a correlated color temperature of 2900 K, or a warm white LED source. As one of skill in the art recognizes, other light sources that provide a smooth spectrum throughout the visible range may also be used. In one embodiment, light passes from the white light source 408 through an illumination focusing lens 410 onto the sample 406 (e.g., a piece of paper) to be measured and is reflected through a detector focusing lens 418, an ultraviolet light filter 416, and an infrared light filter 414 to the colorimeter chip 412 with integral dye filters.

Other embodiments, such as a printer calibrator to be embedded in a printer may not need the ultraviolet light filter 416. The light source 408, colorimeter chip 412, filters 414, 416, and lens 418 are mounted on one circuit board that communicates with a printer CPU (not shown, that replaces the host computer 402), in one embodiment. In one embodiment, the printer calibrator travels across the sample. In another embodiment, the printer calibrator stays stationary and measures a portion of the sample. In one embodiment, the light source 408, colorimeter chip 412, infrared light filter 414, microprocessor and light source power supply 404 are mounted on a circuit board. If the colorimeter chip 412 is close to the sample, the lens 418 is not necessary.

One of skill in the art will recognize that many alternate embodiments are possible having more or less elements than those shown in FIG. 5A. The present invention is not limited to any particular arrangement of various parts of the printer calibration system 400. Nor is the present invention limited to printer calibration systems 400, but includes various other colorimetry applications. Other embodiments include various other arrangements of the major components of the printer calibration system 400; for example, the host computer CPU 502 and microprocessor and light source power supply 404 may be combined.

Figure 6A:
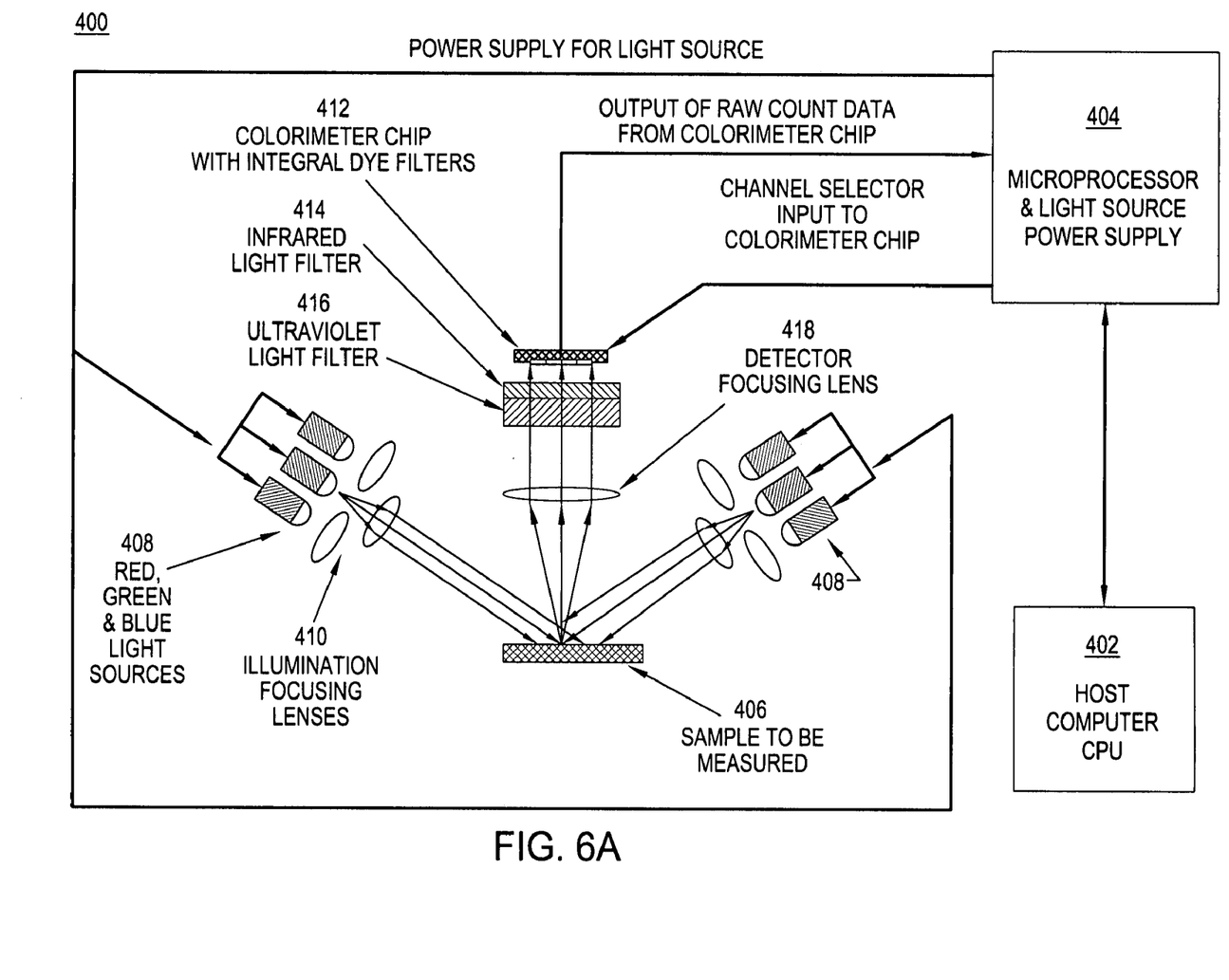
FIGS. 6A and 6B show side and top views, respectively, of an exemplary embodiment of a reflective 45/0 color measurement application with multiple light sources.
Figure 6B:
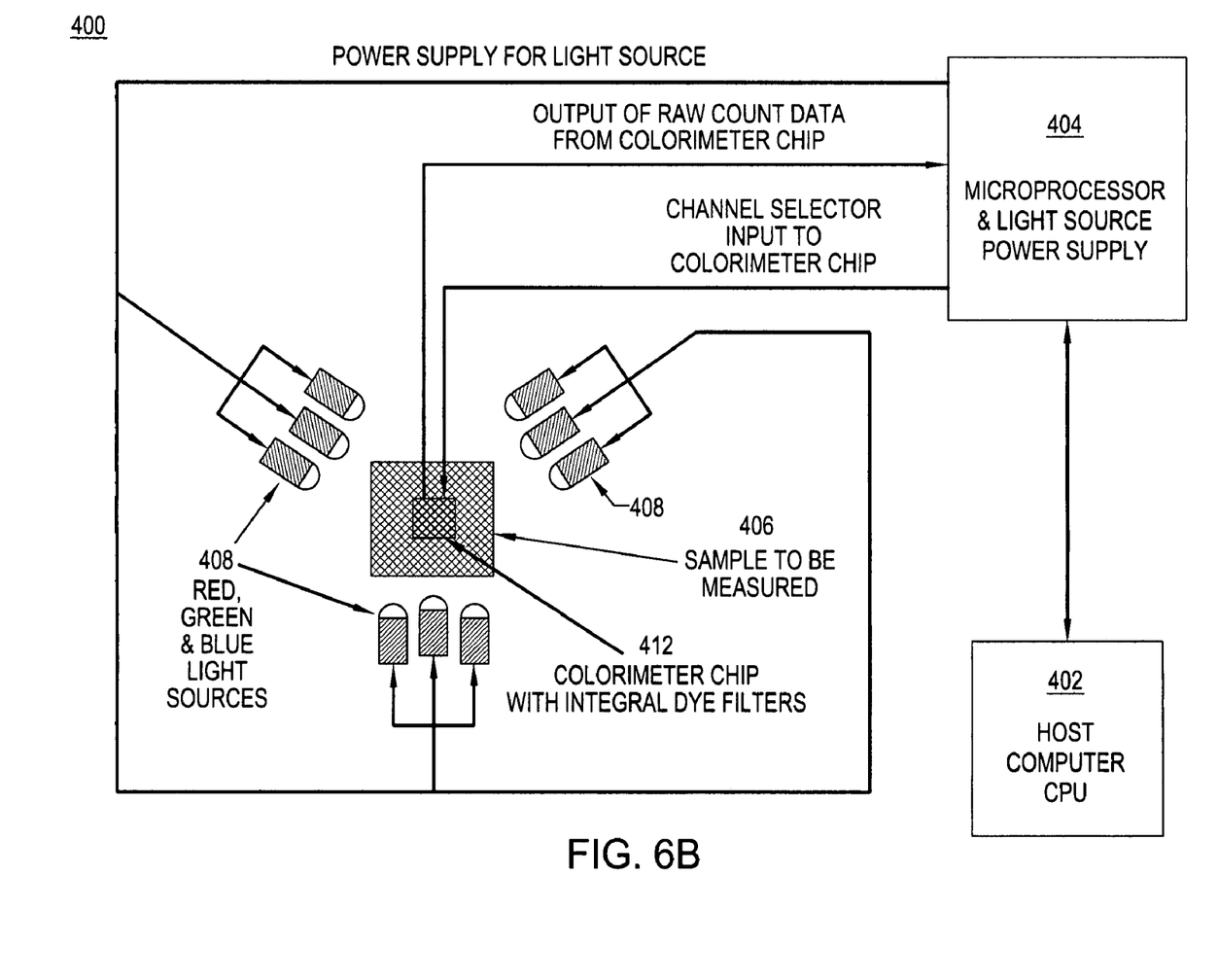

FIGS. 6A and 6B show side and top views, respectively, of an exemplary embodiment of a reflective 45/0 color measurement application with multiple light sources (e.g., three light sources). In this exemplary embodiment, the reflective color measurement application uses multiple light sources 408 to illuminate the sample 406. FIGS. 6A and 6B illustrate the 45/0 measurement geometry where the sample 406 is illuminated at about 45° and the reflected light is viewed at an angle of about 0° (perpendicular to the sample 406). Other embodiments include any number of light sources arranged appropriately. Other arrangements of different and varied components are also within the scope of the present invention.

In FIGS. 6A and 6B multiple LEDs, i.e., red, green, and blue LEDs, are used for full sample illumination spectral coverage. In this exemplary embodiment, the light sources 408 are three sets of red, green, and blue LEDs. The red, green, and blue LEDs cover the visible spectrum when illuminating the sample 406 (instead of a single white light source). Other arrangements of different and varied components are also within the scope of the present invention.

Figure 7:
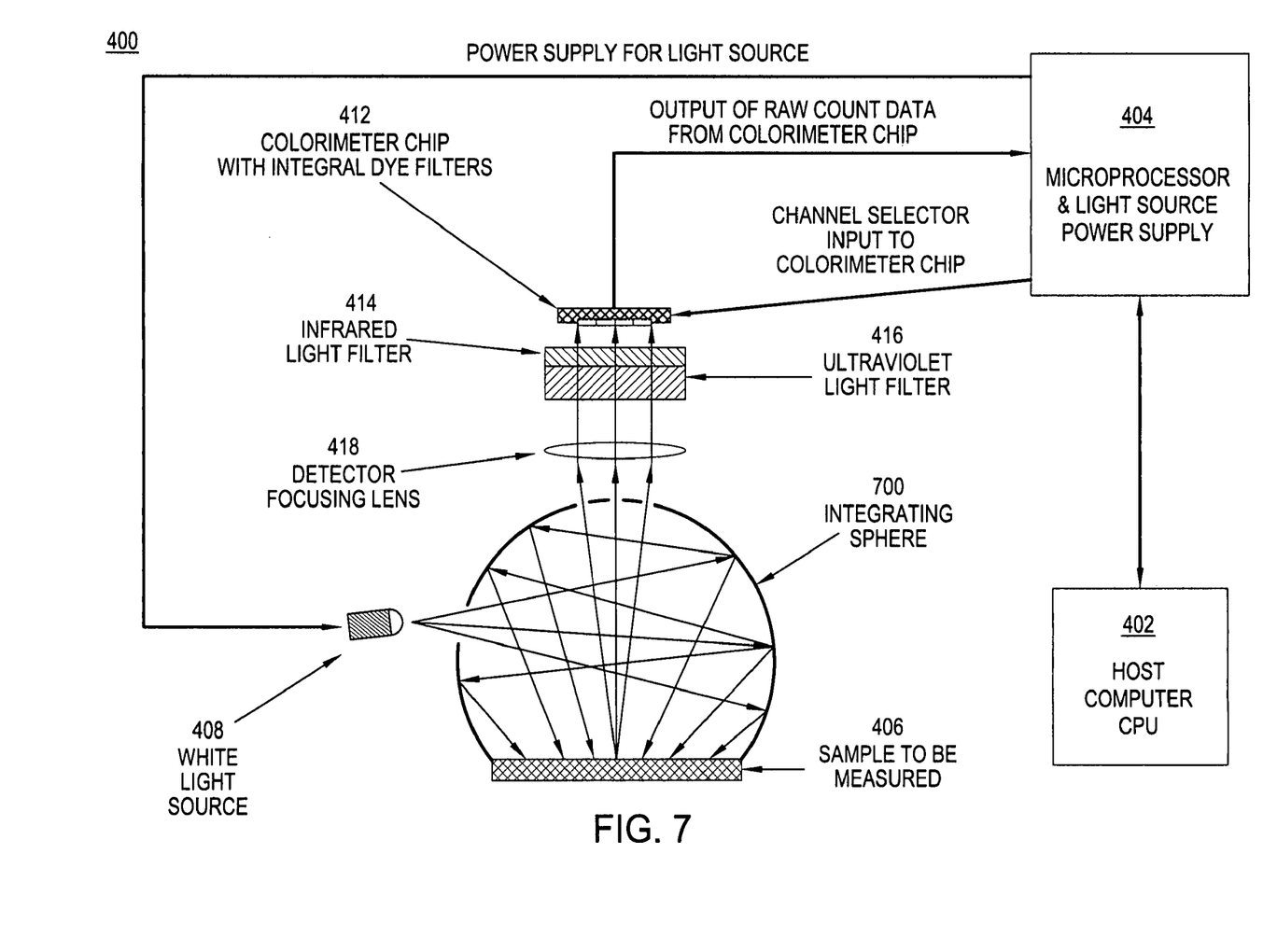
FIG. 7 shows an exemplary embodiment of a reflective diffuse illumination color measurement application with a single light source.

FIG. 7 shows an exemplary embodiment of a reflective diffuse illumination color measurement application with a single light source. In this exemplary embodiment, an integrating sphere 700 diffusely illuminates the sample 406. FIG. 7 illustrates the d/0 measurement geometry in which the sample 406 is illuminated nearly from all 180° and the reflected light is viewed at an angle of 0° (perpendicular to the sample 406). Other arrangements of different and varied components are also within the scope of the present invention, including using multiple light sources to cover the required spectral range (such as using red, green and blue LEDs as described in FIGS. 6A and 6B above).

Various embodiments of tristimulus colorimeters on a single semiconductor chip having at least three detectors, each detector being coated by colorant filters, each detector channel having at least one filter layer and at least one channel having a double layer have been described. Colorimeters determine CIE tristimulus values of reflected light given a light source and inputs to the filters and detectors. Colorimeters having integral dye filters may be constructed on a single silicon chip embodying all the detectors and electronics, with a permanently deposited filter layer(s) coated over each detector. Colorants may be directly deposited on the detectors, rather than using a plastic substrate for a filter.

Exemplary embodiments of the present invention have many advantages, including greater optical efficiency, reduced cost of manufacture, reduced cost of calibration, increased mechanical robustness, increased product lifetime, and increased accuracy. There is greater optical efficiency, because the detectors can be abutted and need no longer be separated. This proximity reduces the need for diffusers and lenses to homogenize the light over the large area of the composite sensor, as done in the past. Removing optical elements increases light throughput and efficiency for a given active area of the device. There is reduced cost of calibration, because as unit-to-unit uniformity of the single-module device increases, separate calibration of each individual unit is unnecessary. Instead, a few representative units in a lot are calibrated. The lifetime of the product is increased through the removal of glue and mechanical attachments. Depositing multiple materials to form the filter structure on at least one of the detectors increases the closeness (accuracy) to target functions of the spectral sensitivities of the device.

Exemplary embodiments of the present invention have many applications, including a printer calibrator. In one embodiment, a single-chip colorimeter within a black-painted cavity is pointed downward at a printed sample viewed through a circular aperture. White light is shone on the sample at about 45 degrees within the cavity from a light source that has horizontal, circular, or hexagonal symmetry about the perpendicular line to the single-chip colorimeter. In another embodiment, a single-chip colorimeter provides a selective illuminant spectrum for applicable reflective or transmissive colorimetry. In one embodiment of colorimeter illumination, LEDs are selected. In yet another embodiment, a single-chip colorimeter provides calibration refinement on application-specific samples (e.g., such as paint chips, reflective display patches, textiles, printed inks) to improve the accuracy of measurement of CIE tristimulus values for that application. One of skill in the art will recognize that the present invention may be implemented in many other colorimetry applications in many industries.

While the foregoing is directed to embodiments of the present invention, other and further embodiments of the invention may be devised without departing from the basic scope thereof, and the scope thereof is determined by the claims that follow.

What is claimed is:

1. A solid-state color-measuring device, comprising:
at least one light source comprising a colorimeter illuminant for illuminating a sample;
a plurality of light detectors; and
a plurality of filters that are permanently deposited onto the solid-state color-measuring device, the filters being included in a plurality of layers such that light reflected off the sample passes through the layers and causes the plurality light detectors to cause the solid-state color-measuring device to produce an output having a plurality of colorimeter-illuminant-weighted spectral responses each approximating a reference-illuminant-weighted CIE-like color-matching function,
wherein a set of combinations of layers is determined, each of the combinations of layers being determined so that the output has the colorimeter-illuminant-weighted spectral responses that are linearly combined to approximate a set of reference-illuminant-weighted CIE-like color-matching functions; and further wherein one of the set of combinations is selected from a set of combinations having a best solution and meeting predetermined performance criteria, the combination that is selected being permanently deposited onto the solid-state color-measuring device.

2. The solid-state color-measuring device of claim 1, wherein the plurality of filters includes an infrared light filter.

3. The solid-state color-measuring device of claim 1, wherein the plurality of filters includes an ultraviolet light filter.

4. The solid-state color-measuring device of claim 1, wherein the solid-state color-measuring device is embedded in a color printer.

5. The solid-state color-measuring device of claim 1, wherein the solid-state color-measuring device operates in a fixed position with respect to the sample being measured.

6. The solid-state color-measuring device of claim 1, wherein the solid-state color-measuring device operates in a motion with respect to the sample being measured.

7. The solid-state color-measuring device of claim 1, wherein the plurality of light detectors is identical.

8. The solid-state color-measuring device of claim 1, wherein each of the plurality of filters has a thickness such that thickness of the plurality of filters in combination produce the output having the spectral responses approximating the illuminant-weighted CIE-like color-matching function.

9. The solid-state color-measuring device of claim 1, wherein each of the plurality of filters is permanently deposited onto a single one of the plurality of light detectors.

10. A colorimeter, comprising:
at least one light source comprising a colorimeter illuminant for illuminating a sample;
a semiconductor substrate having four photodetectors;

four filters permanently deposited on the four photodetectors, wherein each of the four filters is included in a set of layers, wherein one of the four filters comprises a double layer and three of the four filters comprise single layers, and wherein the double layer is cyan and magenta and the single layers are, respectively, red, green, and yellow; and a plurality of channels including the four photodetectors and the four filters so that particular linear combinations of a plurality of colorimeter-illuminant-weighted spectral responses of the plurality of channels each approximate a reference-illuminant-weighted CIE-like color-matching function.

11. The colorimeter of claim 10, wherein a thickness of each of the four filters is between about 0.50 microns and 2.00 microns.

12. The colorimeter of claim 10, wherein the semiconductor substrate has 64 photodetectors.

13. The colorimeter of claim 10, wherein the four filters are absorptive.

14. A system including the colorimeter of claim 10, wherein the system is a printer calibration system.

15. The colorimeter of claim 10, wherein the four filters include an infrared light filter.

16. The colorimeter of claim 10, wherein four filters include an ultraviolet light filter.

17. The colorimeter of claim 10, wherein the colorimeter is embedded in a color printer.

18. The colorimeter of claim 10, wherein the colorimeter operates in a fixed position with respect to the sample being measured.

19. The colorimeter of claim 10, wherein the colorimeter operates in motion with respect to the sample being measured.

20. The colorimeter of claim 10, wherein the four filters are integral with the four photodetectors.

* * * * *